Jan. 2, 1951 — J. W. MEYERS — 2,536,203
ILLUMINATED MIRROR WITH PIVOTED LENS AND REFLECTOR ASSEMBLY
Filed May 7, 1947 — 3 Sheets-Sheet 1
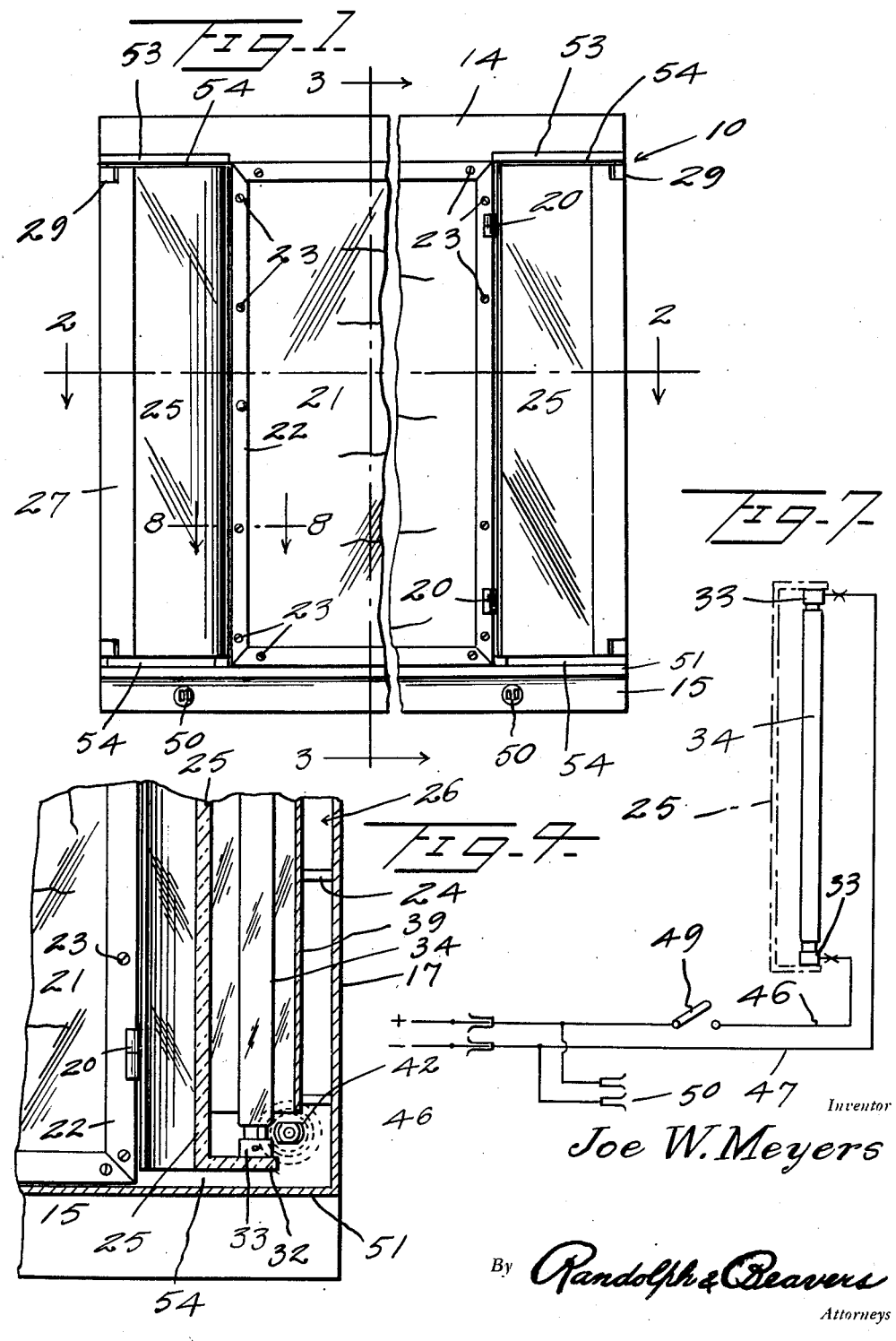
Inventor
Joe W. Meyers
By Randolph & Beavers
Attorneys

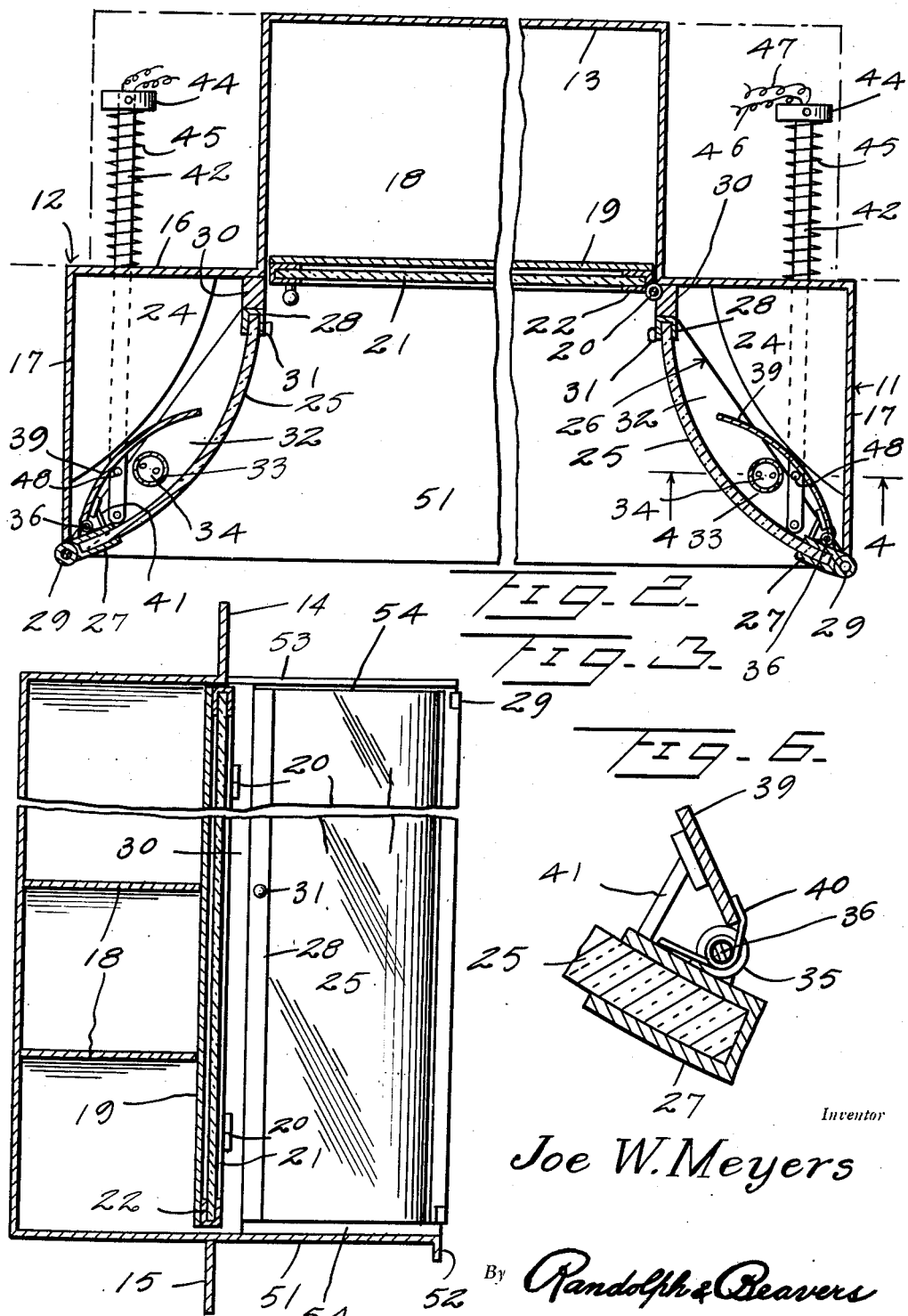

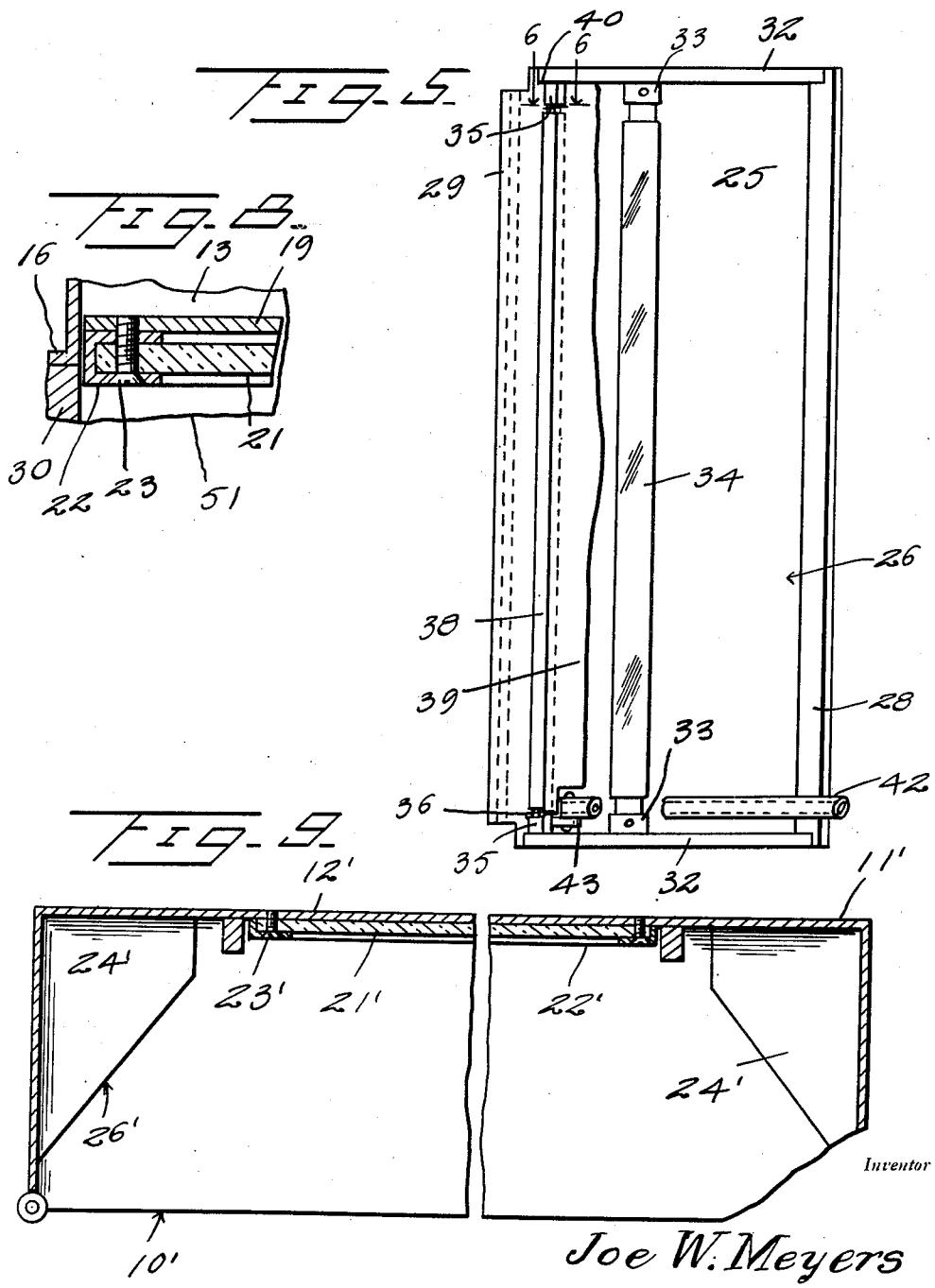

Patented Jan. 2, 1951

2,536,203

UNITED STATES PATENT OFFICE 2,536,203

ILLUMINATED MIRROR WITH PIVOTED LENS AND REFLECTOR ASSEMBLY

Joe W. Meyers, Wetumka, Okla.

Application May 7, 1947, Serial No. 746,456

4 Claims. (Cl. 240—4.1)

This invention relates to an improved construction of illuminated mirror and mirror frame adapted for use either as a wall mirror, a dressing table mirror or a mirror for lavatory cabinets and has particular reference to a mirror provided with improved illuminating means so constructed as to afford ample light to the area adjacent and in front of the mirror for illuminating the face or body of the user, when disposed in a normal position for use of the mirror and for producing illumination wherein shadows will be substantially eliminated on either side of the face or body.

Still another object of the invention is to provide a mirror construction wherein the illuminating means function as closures for compartments containing shelves built in and forming a part of the mirror frame capable of being utilized in conjunction with the mirror and illuminating means for providing a compact and readily accessible storage area.

Still another object of the invention is to provide illuminating means including light diffusing lenses which are constructed and arranged for illuminating the area in front of and adjacent the mirror substantially uniformly.

Various other objects and advantages of the invention will hereinafter become more fully apparent from the following description of the drawings, illustrating preferred embodiments thereof, and wherein:

Figure 1 is a front elevational view of one embodiment of the illuminated mirror;

Figure 2 is a horizontal sectional view thereof taken substantially along a plane as indicated by the line 2—2 of Figure 1 and on an enlarged scale;

Figure 3 is a vertical sectional view taken substantially along a plane as indicated by the line 3—3 of Figure 1;

Figure 4 is a longitudinal vertical sectional view taken substantially along a plane as indicated by the line 4—4 of Figure 2;

Figure 5 is an elevational view, partly broken away and looking toward the inner side of one of the illuminating means;

Figure 6 is an enlarged cross sectional view taken substantially along a plane as indicated by the line 6—6 of Figure 5;

Figure 7 is a diagrammatic view of the electric circuit of the invention, including one of the lamp bulbs;

Figure 8 is an enlarged horizontal sectional view taken substantially along a plane as indicated by the line 8—8 of Figure 1, and Figure 9 is a view similar to Figure 2, with the illuminating means removed, and showing the mirror without the cabinet adapted to be hung or secured to an upright supporting surface and for use as a wall mirror or with a dressing table.

Referring more specifically to the drawings, and first with reference to the embodiment of the invention as illustrated in Figures 1 to 8, inclusive 10 designates generally the improved illuminating mirror in its entirety and which includes a frame, designated generally 11, including a substantially flat plate 12 having a rearwardly offset centrally disposed portion 13 forming a cabinet and which is adapted to be contained in a recess of a wall, not shown, and so that the plate 12 will be disposed substantially flush thereagainst. The plate 12 is provided with top and bottom edge portions 14 and 15, respectively, which extend from side to side thereof and which form flanges which may be utilized for receiving securing means, not shown, for securing the mirror 10 to the wall surface. The complementary side portions 16 of the plate 12 which are located one on either side of the recessed cabinet portion 13, are each provided with an outturned flange at the outer edge thereof forming an upright wall 17, which walls are disposed at substantially right angles to the side portions 16, as clearly seen in Figure 2.

The recess portion 13, as seen in Figure 3, is provided with shelves 18 to form the recessed wall cabinet and the open front thereof is adapted to be closed by a door or closure 19 which is hinged at 20 along one side edge thereof and which has a mirror 21 secured to and substantially covering the outer side thereof and which is contained in a frame 22 of substantially U-shaped cross section which is secured to the closure 19 by fastenings 23, as seen in Figures 1 and 8.

The related portions 16 and 17 at each side of the frame 11 are provided with a plurality of shelves 24 and, in combination with a lens 25 form an additional storage compartment 26 on each side of the mirror 21. Each lens 25 extends from adjacent the top to adjacent the bottom of its compartment 26 and is arcuate and outwardly bowed in horizontal or cross section, as seen in Figure 2, and each of said lenses has its longitudinal side edges contained in channel members 27 and 28. The channel members 27 are hingedly connected at 29 to the outer edges of the walls 17 and the channel members 28, which are located along the free edges of the lenses 25 are adapted to be normally disposed in flush engagement with a beading strip 30 which extends outwardly from the contiguous side portion 16 and which combines with the lens 25 thereof for closing the open inner side and end of its compartment 26. Each of the channel members 28 is provided on its outer side with a knob 31 by means of which the lenses or closures 25 may be swung to open positions in directions away from the mirror 21.

The lenses 25 may be formed of any suitable transparent material and are provided with inturned top and bottom portions forming flanges 32 on which are mounted opposed, inwardly projecting electric lamp sockets 33 constructed and arranged for supporting a fluorescent or cold cathode lamp bulb 34 behind each lens 25.

As best seen in Figure 6, each channel member 27 is provided on its inner side and adjacent each end thereof with a hinge eye 35 to receive a hinge pin 36 which extends through a barrel portion 38 of an elongated reflector 39. One of the reflectors 39 is thus disposed behind each lamp bulb 34 and said reflectors 39 are bowed longitudinally in the opposite direction to the adjacent lenses 25. The hinge pins 36 carry springs 40 which urge the reflectors 39 toward the bulbs 34 and the lenses 25 and the movement of the reflectors 39 in response to the springs 40 is limited by stops 41 which project from the inner sides of said channel members 27 and which combine with the springs 40 for properly positioning the reflectors 39 relatively to the lamp bulbs 34 and lenses 25 for properly reflecting the light from said bulbs outwardly through said lenses, as will hereinafter become more fully apparent.

As best seen in Figures 2 and 5, a conduit 42 extends reciprocally through each of the wall portions 16 and said conduits 42 project into the compartments 26 and are attached by ears 43 to the inner sides of the channel members 27. The conduits 42 are provided with heads 44 at their opposite ends, which are normally spaced a considerable distance from the side walls 16 and each carry an expansion coil spring 45, between the associated side wall 16 and head 44. The conduits 42 are provided for receiving electrical conductors 46 and 47 which extend therethrough and which project from openings 48 thereof for connection to the sockets 33 for providing current for the lamp bulbs 34, as indicated diagrammatically in Figure 7. As seen in Figure 7, a switch 49 may be interposed at any desired point in the circuit of the conductors 46 and 47 and may be mounted in any desired position on the mirror 10 or on a wall adjacent thereto and one or more outlets 50 are preferably connected in the circuit of the conductors 46 and 47 between their source of current and the switch 49 and such outlets 50 may be mounted in any desired location on the mirror frame 11 as for example, in the bottom flange 15 thereof, as seen in Figure 1, for affording an electrical connection for electrical appliances, not shown, such as electric razors.

The frame 11 is provided with a shelf 51 which projects outwardly from the plate 12 at the level of the bottom edge and beneath said cabinet 13, and said shelf 51 extends from side to side of the frame 11 to form a bottom for each of the side compartments or cabinets 26 and is provided with a down turned flange or lip 52 at its outer edge, as best seen in Figure 3. The side portions 16 are also provided with outwardly projecting wall portions 53 of a shape substantially corresponding to the cross sectional shape of the side cabinets 26 and forming the top walls thereof. As seen in Figure 3, the flange portions 32 of the lenses 25 are spaced from the shelf 51 and walls 53 to form spaces 54 therebetween to permit a circulation of air through the side cabinets 26 when the lenses 25 are in closed positions, as seen in Figure 2, for carrying off hot air from the lamp bulbs 34.

From the foregoing, it will be readily apparent that when the switch 49 is closed, the lamps 34 will be energized and the light rays therefrom will pass directly through or be reflected from the reflectors 39 through the lenses 25 for illuminating the area in front of the mirror 21. The convex cross sectional shape of the lenses 25 will diffuse the light rays passing therethrough for evenly lighting the area in front of the mirror 21 so that said area will be well illuminated and in such a manner that substantially no shadows will be cast on the face or body when positioned in front of the mirror, as for example, in applying make-up or shaving or in arranging the hair, and the reflectors 39 are so arranged relatively to the lenses 25 and the light sources 34 that substantially all glare will be eliminated.

The lenses 25 may be swung to open position by grasping the knobs 31 to afford access to the shelves 24 of the compartments 26 or for removing and replacing the lamp bulbs 34, for which latter function, the reflectors 39 can be swung on their pivots away from the lenses 25 to provide ready access to the lamp bulbs. When the lenses 25 are thus swung to open position, the conduits 42 will be drawn inwardly of the compartments 26 and when the lenses 25 are again moved to the closed positions of Figure 2, the springs 45 will return the conduits 42 to their positions of Figure 2, thereby preventing the conductors 46 and 47 from lying loose in the compartments 26. Further, the springs 45 through the conduits 42 will tend to resiliently draw the lenses 25 to closed positions and to retain said lenses in their positions of Figure 2. The closure 19, carrying the mirror 21, may be swung in a counter-clockwise direction, as seen in Figure 2, to an open position for affording access to the recessed cabinet 13.

Obviously, if desired, an illuminated mirror 10' similarly constructed, could be hung on a wall or other upright supporting surface and/or could be fastened in any other desired manner thereto, and in which case, as illustrated in Figure 9, the recessed portion 13 would be omitted and the frame 11' thereof would be provided with a substantially flat rear wall 12' to the forward central portion of which a mirror 21' is attached by a frame 22' of L-shaped cross section and fastenings 23' which extend through the frame and mirror and into said wall 12'. The side cabinets 26' are shown with shelves 24' of slightly modified shape and with the illuminating means, reflectors and lenses not herein again illustrated since said parts correspond to the illuminating means, reflectors, and lenses, respectively, as illustrated in Figures 1 to 7. Likewise, for the embodiment of Figure 9 the conduits 42 may be dispensed with if space is not available behind the lower portion of the frame 11' for accommodating the conduits and parts 44 and 45. Likewise, the illuminated mirror 10' of Figure 9 could be utilized by being mounted on a dressing table, chiffonier or other article of bedroom furniture.

Various other modifications and changes are likewise contemplated and may obviously be resorted to, without departing from the spirit or scope of the invention, as hereinafter defined by the appended claims.

I claim as my invention:

1. An illuminated mirror comprising a mirrored surface, an illuminating means disposed at an angle to the mirrored surface and spaced therefrom in directions outwardly of the plane of the mirrored surface and outwardly relatively to certain of the edges thereof for illuminating the area in front of or outwardly of said mirrored surface, said illuminating means including a plurality of elongated light sources each having a lens disposed outwardly thereof and a reflector behind the light source and lens, said lenses being bowed transversely in directions away from the associated light sources for diffusing the light rays passing therethrough, said reflectors being bowed transversely and in opposite directions to the lenses, means for swingably supporting each lens, said reflectors each being pivotally supported on said means of its associated lens and normally disposed in close proximity to the light sources thereof, spring means for urging the reflectors toward the light sources, and stop means carried by the lens supporting means and limiting the swinging movement of the reflectors toward the light sources in response to said spring means for normally retaining said reflectors in predetermined positions relatively to the lenses and light sources, said lenses being swingably supported for outward movement away from the mirrored surface, and the illuminating means and reflectors being supported for swinging movement with the lenses.

2. In an illuminated mirror, an upright supporting member provided with outturned side edge portions forming side walls, a mirror secured to a portion of the forward side of said member and spaced from said side walls, a lens support hingedly mounted along one longitudinal edge thereof to the outer edge of each side wall, a lens supported by the lens support and extending toward the supporting member to combine with said side wall and the portion of the supporting member, disposed between the side wall and adjacent edge of the mirror, to form a cabinet with said lens as the closure or door thereof, an electrically energized light source supported on each lens and disposed on the inner side thereof, and a reflector pivotally supported on each lens support and positioned behind the associated lens and light source.

3. An illuminated mirror as in claim 2, conduit means extending reciprocally through said supporting member and into said side cabinets and each provided with an end pivotally connected to one of the lenses, said conduit means being adapted to contain electrical conductors leading to said light sources and affording means to permit the lenses, light sources and reflectors to be swung to open positions, and spring means carried by said conduits for urging them toward extended positions relatively to said cabinets and for urging the lenses toward closed positions.

4. An illuminated mirror as in claim 2, spring means for urging said reflectors toward their associated light sources and lenses, and stop means cooperating with said spring means for normally retaining the reflectors in predetermined positions relatively to the light sources and lenses.

JOE W. MEYERS.

REFERENCES CITED

The following references are of record in the file of this patent:

UNITED STATES PATENTS

| Number | Name | Date |
|---|---|---|
| 1,647,149 | Ryan | Nov. 1, 1927 |
| 1,868,104 | Hoegger | July 19, 1932 |
| 1,918,047 | Marchand | July 11, 1933 |
| 1,930,244 | Lewinsohn et al. | Oct. 10, 1933 |
| 1,948,112 | Hoegger | Feb. 20, 1934 |
| 1,996,126 | Sipp | Apr. 2, 1935 |
| 2,046,393 | Lewinsohn | July 7, 1936 |